United States Patent [19]

Kuppenheimer, Jr.

[11] Patent Number: 4,682,338
[45] Date of Patent: Jul. 21, 1987

[54] MULTI-LAMP LASER PUMPING CAVITY

[75] Inventor: John D. Kuppenheimer, Jr., Tewksbury, Mass.

[73] Assignee: Sanders Associates, Inc., Nashua, N.H.

[21] Appl. No.: 813,356

[22] Filed: Dec. 26, 1985

[51] Int. Cl.$^4$ .................................................. H01S 3/093
[52] U.S. Cl. ........................................ 372/72; 372/99; 350/629
[58] Field of Search ................ 372/72, 99, 70, 98, 372/92, 69

[56] References Cited

U.S. PATENT DOCUMENTS 4,483,007  11/1984  Winston ................................. 372/72
4,641,315  2/1987  Draggoo ................................. 372/72

Primary Examiner—Eugene R. LaRoche
Assistant Examiner—Seung Ham
Attorney, Agent, or Firm—Richard I. Seligman

[57] ABSTRACT

An optically pumped solid-state laser system includes a rod (50) of laser material and a plurality of flashlamps (66) for pumping the laser. A surface for reflecting radiation from the flashlamp (66) to the rod (50) follows a set of curves (96). Each curve (96) is the locus of points whose distances outside the rod (50) and the lamp (66) to a pair of starting points on the other side of a base line (74) are a constant value such that the locus includes a lamp cusp (70).

4 Claims, 6 Drawing Figures

MULTI-LAMP LASER PUMPING CAVITY

BACKGROUND OF THE INVENTION

The present invention is directed to pump cavities for lasers. It specifically concerns such cavities for laser systems in which the laser rod is to be pumped by a plurality of lamps or a plurality of rods are to be pumped by a single lamp.

The power for an optically pumped solid-state laser is typically provided by one or more flash lamps exterior to a rod of laser material. The lamps shine on the rod, and the radiation promotes electrons in the laser rod to higher energy levels, from which they are stimulated to fall by lasing action to cause coherent laser light.

In high-power lasers, it is important that the radiation from the flash lamps be converted efficiently to electron energy. This requires that some of the radiation from each the lamp be reflected so that it reaches the laser rod rather than radiating off into space. However, any reflection results in some power loss, so it is desirable to keep the number of reflections in the paths from the lamp to the rod as low as possible. It is also desirable to prevent the radiation from being reflected back into the flashlamp, since such reflections also result in a loss of efficiency.

It has been shown that the best uniformity of radiation, and the theoretically highest etendue, i.e., the highest throughput or efficiency of conversion of lamp-radiation energy to electron energy, are achieved if a reflector surface is used that touches the surfaces of the laser rod and lamp and forms curves similar to those shown in FIG. 1. The perimeter of the radiating surface of the lamp 14 is equal to the perimeter of the laser rod 12, and the reflector curves are generated in a "constant-string-length" method similar to one that will be discussed below.

FIG. 1 shows the cross section of a laser rod 12 and a flash lamp 14 enclosed by two reflecting walls 16 and 18 that contact the laser rod 12 and the lamp 14. In practice, however, it ordinarily is not possible to bring the reflecting surface completely into contact with the radiating surface of the lamp, and it may also be impractical to bring it into contact with the rod surface, so it is necessary to settle for an efficiency lower than the theoretically possible level.

The highest efficiency available, given the requirement of particular separations of the reflector wall from the lamp and the rod, can also be generated by a "constant-string-length" method. This method as used for a particular pair of separations is illustrated in FIG. 2. It will be assumed that the reflecting wall can be brought no closer to the rod surface than $d_1$ and no closer to the lamp surface than $d_2$. These distances thus define circles 20 and 22 from the interior of which the reflecting wall must be excluded.

In FIG. 2, two tangent lines 26 and 28 intersect a base line 29 defined by the axes of the lamp and rod. Tangent lines 26 and 28 define points of tangency 30 and 32 and 34 and 36, respectively. The curve that results in the most efficient and uniform transfer of power can be thought of as being generated by a pencil 38 whose tip holds taut a string 40 secured to the rod and lamp at tangent points 32 and 34. The pencil 38 begins at a so-called cusp point 42. Cusp point 42 is the point colinear with the lamp and rod axes, disposed on the side of the lamp 14 opposite the rod 12, and spaced by the lamp stand-off distance $d_2$ from the surface of the lamp 14.

With the initial length of the string being such as to render it taut when the pencil is disposed at cusp 42, the pencil draws curve 44 while keeping string 40 taut. Eventually, the curve terminates on a rod cusp 46.

A lower curve is generated similarly, but with the string attached to tangent points 30 and 36 rather than tangent points 32 and 34.

The curves 16 and 18 of FIG. 1 are generated similarly, the most apparent difference being that the cusps lie on the surface of the lamp 14 and the rod 12. Another difference between the arrangements of FIGS. 1 and 2 is that, while the actual perimeters of the laser rod 12 and the lamp 14 are equal in the FIG. 1 arrangement, they may be different in the FIG. 2 arrangement, because the relationship of the lamp and rod sizes is such that the "effective perimeters" are equal. The effective perimeter for the laser rod 12 is the shortest distance from its cusp 46 around the rod 12 and back to the cusp 46. The equivalent perimeter for the lamp 14 is similarly the shortest distance from its cusp 42 around the lamp 14 and back to its cusp 42. If the effective rod and lamp perimeters are equal, the actual lamp and rod perimeters differ when the lamp and rod stand-off distances are different.

With the arrangement of FIG. 1, there are points on the lamp 14 from which light strikes the laser rod 12 either directly or after only a single reflection from surface 16 or 18, depending on the angle from which the light leaves the point. For other points, namely, those for which the laser rod 12 is beyond the "horizon," the light hits the rod 12 after one or two reflections, the number of reflections again depending on the angle at which the light leaves the point. If the total radiation produced by the lamp is considered, the average number of reflections is as low as is theoretically possible, and none of the light is reflected back to the lamp. Thus, the etendue, or throughput, is at a theoretical maximum, as is the radiation uniformity. Uniformity is important because the rod size needed for a given power level is smallest if the radiation that it receives is uniform.

With the FIG. 2 arrangement, the reflecting surface does not touch the surfaces of the lamp 14 and rod 12, so some of the light is reflected back into the lamp 14, and the throughput is less than the theoretical maximum. However, it is the maximum uniform throughput that can be achieved with reflecting surfaces that are required to stand off by the given distances.

While the foregoing designs result in a level of throughput and pumping uniformity that are the highest possible in view of the stated design constraints, their application is limited. The laser rods in some applications must have large diameters in order to keep the laser-radiation fluences at levels below the damage threshold of the laser material. In the foregoing designs, it is necessary that the circumference of the flash lamp roughly equal that of the laser rod. This requirement is often at odds with optimum flash-lamp design parameters. Accordingly, multiple flash lamps are sometimes used. But multiple-lamp designs have in the past departed from the optimum throughput and uniformity provided by the foregoing designs.

It is accordingly an object of the present invention to provide multiple-lamp systems with the throughput and uniformity of the single-lamp designs described above.

SUMMARY OF THE INVENTION

The foregoing and related objects are achieved in a multi-lamp laser system in which the curves of the reflecting surfaces are drawn in a manner similar to that described in connection with FIG. 2 but in which the points to which the "string" is "attached" are determined in a different manner and in which the relationships between the perimeters of the rod and the lamps are different.

Specifically, to determine the points of string attachment, one first picks a plurality of rod cusps like cusp 44. The number of rod cusps is equal to the number of lamps, and these cusps are equiangularly spaced around the rod. The lamps are so spaced that each base line defined by the rod axis and one of the lamp axes bisects the angle formed by the rod axis and a different pair of adjacent rod cusps.

In some instances, the points of attachment of the strings are determined in a manner essentially the same as that in which those points were determined in the example of FIG. 2. That is, they are the points of tangency of the lines that are tangent to both the lamp and the rod and that intersect the base line connecting the lamp and rod axes. However, if the point of tangency of such a line with the rod would fall within the rod horizon of a rod cusp, the tangent lines are pivoted about the lamp so that they remain tangent to the lamp but move off the surface of the rod so as to include the cusp. In such situations, the points at which the strings are attached are the rod cusps and the new tangent points on the lamps.

Another difference between the present invention and the arrangement of FIGS. 1 and 2 is the relationship of the lamp and rod sizes. Specifically, the effective perimeter of a given lamp in accordance with the present invention is not equal to the effective perimeter of the rod. Instead, it is equal to an associated part of the equivalent perimeter of the rod, and the effective perimeter of the rod is differently defined.

Specifically, in a multi-lamp arrangement according to the present invention, the effective rod perimeter is not simply the shortest distance from the rod cusp around the rod to the rod cusp again. Instead, it is the shortest distance from a rod cusp around not only the rod but also the other rod cusps and back to the original rod cusp. The portion of the effective rod perimeter that the effective lamp perimeter must equal is the portion between the two rod cusps that flank the base line that the lamp forms with the rod.

A multi-lamp system with a cavity formed in this manner will have the maximum throughput and uniformity that is possible for a given pair of stand-off distances.

BRIEF DESCRIPTION OF THE DRAWINGS

These and further features and advantages of the present invention are described in connection with the accompanying drawings, in which.

DETAILED DESCRIPTION OF THE PREFERRED EMBODIMENTS

Figure 1:
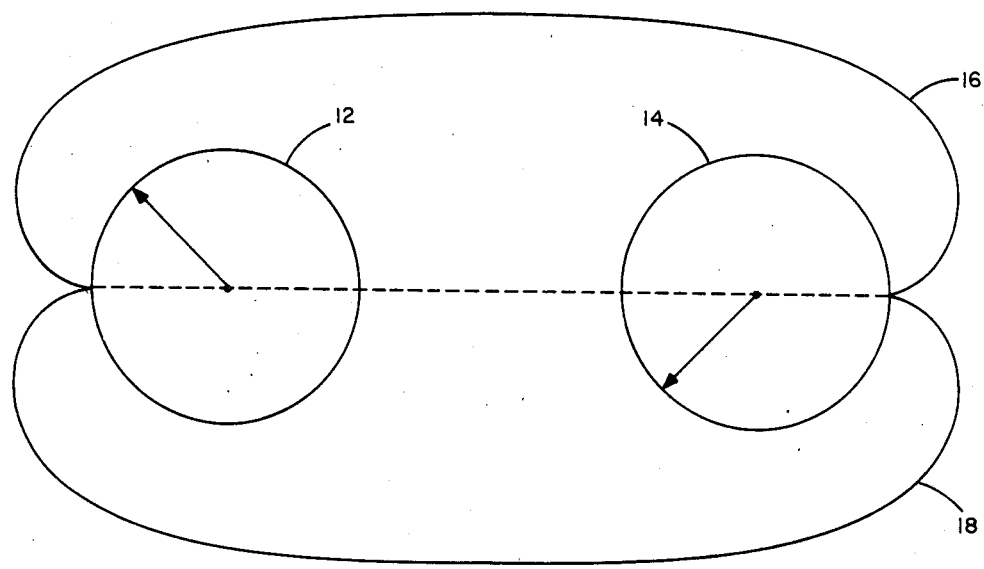
FIG. 1 is a diagrammatic representation of the cross section of a laser rod, flashlamp, and reflecting walls in a theoretically optimal prior-art arrangement.
Figure 2:
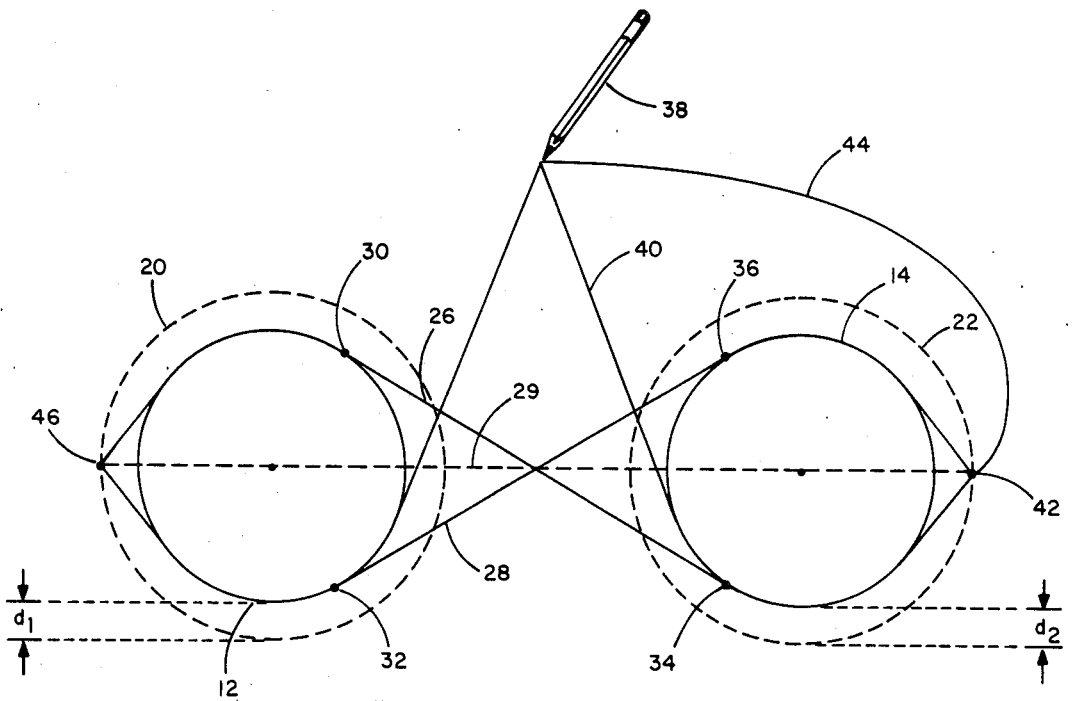
FIG. 2 is another diagrammatic cross-sectional diagram illustrating the manner in which the reflector-surface curve is generated for pratical prior-art systems, in which it may not be possible for the reflector wall to touch both the surface of the laser rod and the radiating surface of the lamp.
Figure 3:
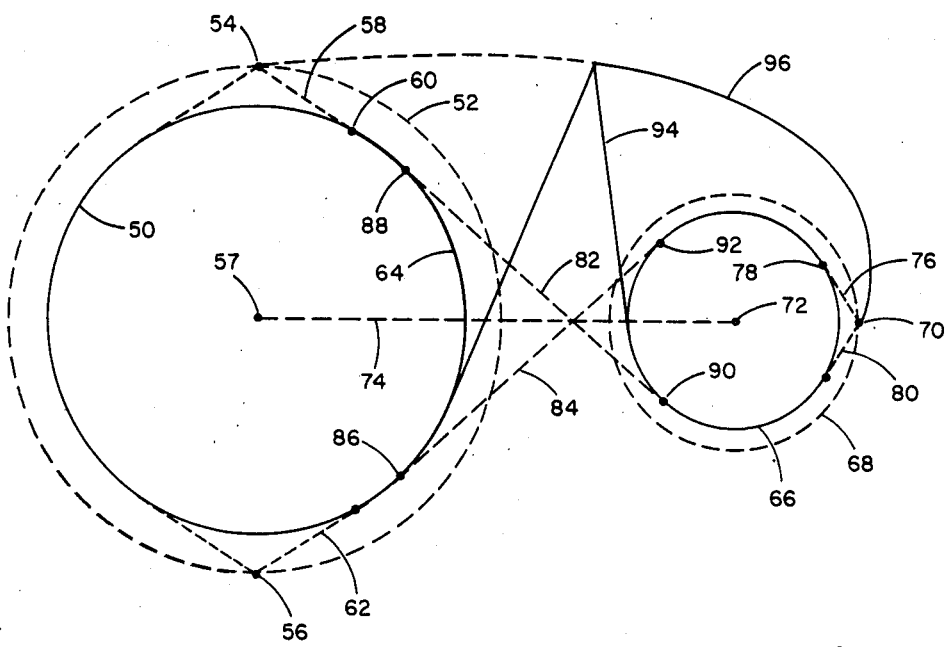
FIG. 3 is a diagrammatic representation of of the cross section a laser rod and one lamp of a multi-lamp system whose reflector-surface curve is to be generated in accordance with the present invention.

FIG. 3 depicts a laser rod 50 to be used in a two-lamp system employing the teachings of the present invention. Because cooling tubes (not shown) are to be used on the laser rod 50, the reflector surface cannot come closer to the surface of the laser rod 50 than a stand-off distance represented by dashed lines 52 around the rod 50. To generate the reflector surface, the "cusps" at which the reflector surface is to make its closest approach to the rod 50 are selected. Because there are to be two lamps, two cusps 54 and 56 are equiangularly disposed around the rod axis 57 at the rod stand-off distance from the surface of the rod 50.

A requirement for optimum throughput and uniformity is that the part of the "effective perimeter" of the rod associated with a given lamp be equal to the "effective perimeter" of the lamp. The part of the effective perimeter associated with one of the lamps is the distance represented by dashed line 58 between one cusp 54 and its horizon 60 on the surface of the rod 50, a corresponding distance 62 between the other cusp 56 and its horizon, and the portion 64 of the rod perimeter between the two cusp horizons. This distance must equal the effective lamp perimeter.

The reflector surface must stand off from the radiating surface of the lamp 66 by a stand-off distance represented by dashed lines 68. The point of closest approach of the reflecting surface will be the lamp cusp 70, which is on a point colinear with the rod and lamp axes 57 and 72. The base line 74 associated with lamp 66 extends between the axes 57 and 72, all points on the base line 74 being equidistant from the rod cusps 54 and 56. The effective perimeter of the lamp 66 is the distance represented by a dashed line 76 from the cusp 70 to its horizon 78 on the radiating surface of the lamp 66, a similar distance 80 from the cusp 70 to its other horizon, and the part 88 of the actual lamp perimeter beyond the two lamp-cusp horizons.

Each segment of the reflector wall is the locus of points the sum of whose distances outside the lamp 68 and the rod 52 from "starting points" on the lamp and the rod are equal to a fixed total. To generate the curve, it is necessary to locate these starting points, and this is done by finding the two tangent lines that intersect the base line 74 and are tangent to both the lamp 66 and the rod 50. These tangent lines are represented in FIG. 3 by dashed lines 82 and 84. The resultant tangent points are points 86 and 88 on the rod 50 and points 90 and 92 on the flashlamp 66. A first pair of starting points is thus points 86 and 90, and the sum that defines the curve of the reflector surface is the sum of the shortest distances outside of the rod 50 and the lamp 66 from those starting points through the base line 57 to the lamp cusp 70.

Generation of the curve can be thought of as the use of a "string" 94 attached to the starting points 86 and 90 and held taut by a pencil drawing the curve. The "string" must skirt the lamp 66 and rod 50, as FIG. 3 indicates; that is, the distances to be held constant are the distances outside the rod 50 and the lamp 66. The resultant curve 96 continues from the point depicted in FIG. 3 and terminates at one of the rod cusps 54. (In practice, of course, the curves are not produced graphically but are generated by computer using equivalent algebraic expressions. Since graphical treatment is more intuitively appealing than the algebraic expressions, however, the graphical treatment will be used here.)

The other reflector section associated with lamp 66 is generated in a manner that is similar but employs starting points 88 and 92 rather than starting points 86 and 90. The complete reflector includes those two reflector sections plus sections generated in a similar manner for a lamp disposed on the side of the rod 50 opposite lamp 66. The resultant reflector 98 is depicted in FIG. 4.

Figure 4:
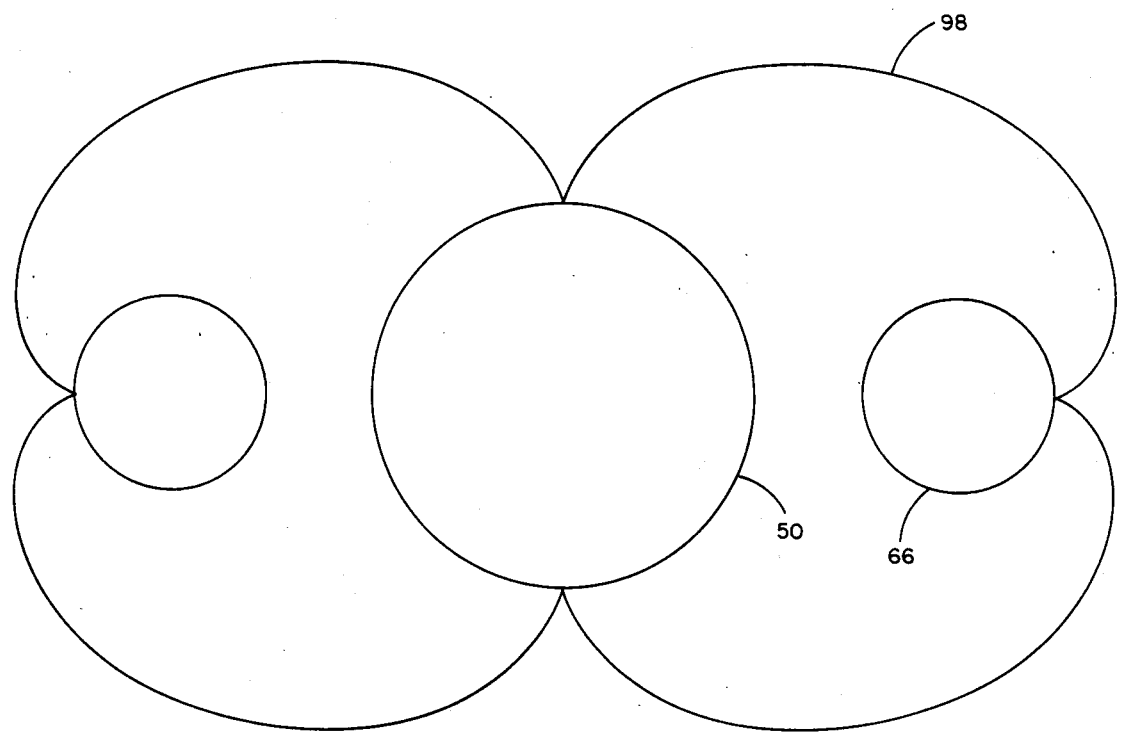
FIG. 4 is a diagram depicting the resultant reflector curve.

It can now be appreciated that generation of the reflector curve for the system depicted in FIGS. 3 and 4 differs from generation of prior-art optimal single-lamp systems in that the effective lamp perimeter is matched to only part of the effective rod perimeter and in that multiple rod cusps represent multiple closest approaches of the reflector surface to the rod surface. A further difference is not apparent in the arrangement of FIGS. 3 and 4 but can be appreciated by reference to the arrangement of FIGS. 5 and 6, which depict a rod and one of the lamps of a four-lamp version.

Figure 5:
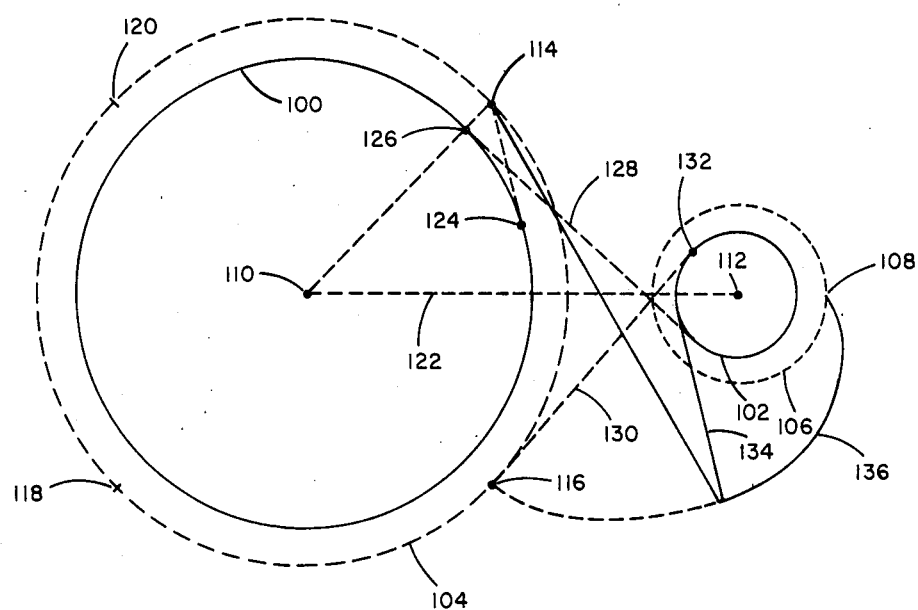
FIG. 5 is a diagram similar to FIG. 3 but depicting the manner in which a curve is drawn for a four-lamp system.

In FIG. 5, a laser rod 100 and a lamp 102 are shown with their stand-off distances indicated by dashed lines 104 and 106, respectively. The lamp cusp 108 is, as before, colinear with the rod and lamp axes 110 and 112. However, because there are to be four lamps, there are four rod cusps 114, 116, 118, and 120 disposed equiangularly around the rod 100 and separated from its surface by the rod stand-off distance. The lamp 102 is so positioned that the base line 122 extending between the rod axis 110 and the lamp axis 112 is equidistant from two rod cusps 114 and 116. The part of the effective rod perimeter associated with lamp 102 is the length of the shortest path outside the rod 100 between the two cusps 114 and 116 that flank the base line 122 associated with lamp 102.

Generation of the reflector curve in the arrangement of FIG. 5 differs from that in the arrangement of FIG. 3 because the positions of the cusps 114 and 116 in FIG. 5 result in a different definition of the starting points. In FIG. 3, the point of tangency 88 of the common tangent line 82 with the rod 50 is closer to the base line 74 than is the horizon point 60 of the cusp 54. That is, the point of tangency 88 is "over the horizon" from the cusp 54, and that point of tangency is chosen as one of the starting points. But a common tangent line such as line 82 is used to define the starting points only when, as in FIG. 3, the point of tangency of such a line with the rod is over the cusp horizon from the cusp.

In FIG. 5, on the other hand, the horizon point 124 of cusp 114 is closer to the base line 122 than is the tangent point 126 of a line 128 tangent to both the rod 100 and the lamp 102. In some cases, the starting points are defined by lines tangent to the lamp, intersecting the base line, and including the cusp. Such a line is exemplified by dashed line 130 in FIG. 5. The starting points defined by this line are cusp 116 and the point 132 of tangency of line 130 with the lamp 102. A second such line, omitted from FIG. 5 for the sake of clarity, is tangent to the lamp 102, intersects the base line 122, and includes cusp 114, thereby defining two further starting points.

The curve is then generated in a manner similar to that employed to generate the curves of FIG. 4. This technique is suggested in FIG. 5 by "string" 134, which represents the lengths whose sums are kept constant in generating the curve 136 that the reflecting surface will follow.

Figure 6:
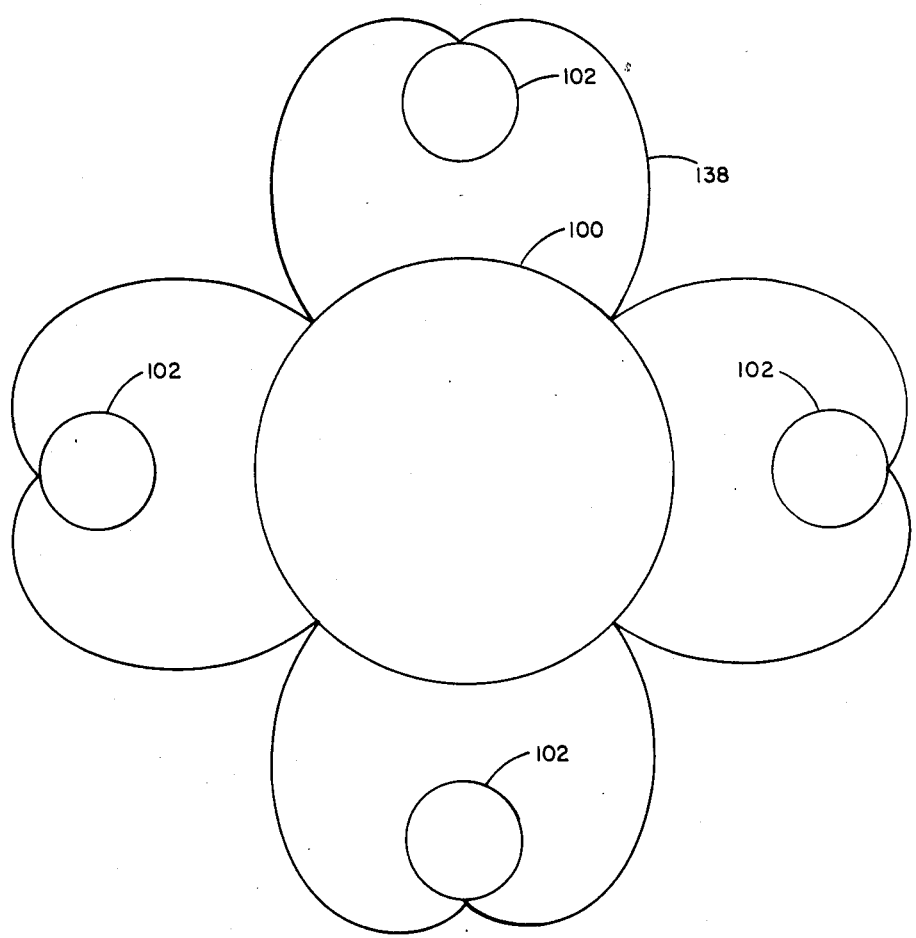
FIG. 6 is a diagram depicting the curve for the four-lamp system.

Completing this technique for the other starting points and for all of the lamps results in the reflector curve 138 depicted in FIG. 6.

Those skilled in the art will recognize that the teachings of the present invention can be applied in systems that differ from the illustrated ones. For example, the stand-off distance for the lamp or the rod may equal zero. Furthermore, the same type of reflecting scheme can be used in systems in which a single flash lamp pumps a plurality of laser rods. The present invention thus has a wide range of application and represents a significant advance in the art.

I claim:
1. An optically pumped laser comprising:
   A. a cylindrical laser rod having a longitudinal central rod axis;
   B. a plurality of cylindrical lamps for optically pumping the laser rod, the lamps having longitudinal central lamp axes parallel to the rod axis, the lamps being so located with respect to each other and to the laser rod as to define in cross section a base line associated with each lamp and extending between the rod axis and the lamp axis of the associated lamp, the base lines being equal in length and equiangularly spaced; and
   C. a reflector wall consisting essentially of first and second wall sections associated with each lamp, the cross sections of the first and second wall sections associated with a given lamp essentially following first and second curves extending from a lamp cusp associated with the given lamp to second and first rod cusps, respectively, associated with the given lamp, the first and second curves consisting of the loci of points to which the sums of the distances, exterior to the laser rod and the given lamp, from first and second rod starting points, respectively, associated with the given lamp and from first and second lamp starting points, respectively, on the given lamp equal a fixed quantity, where:
      i. the rod cusps are points spaced a predetermined rod stand-off distance from the rod surface, are equal in number to the number of lamps, are equiangularly spaced around the laser rod, and are equidistant from the adjacent base lines, the two rod cusps associated with a given lamp being a pair of rod cusps adjacent to each other and disposed on opposite sides of the base line associated with the given lamp;
      ii. the first and second lamp starting points on a given lamp are the points of tangency therewith of first and second tangent lines, respectively, associated with the given lamp, the first and second tangent lines associated with a given lamp being the lines that (a) intersect the base line associated with the given lamp, (b) are tangent to the given lamp, (c) are tangent to the rod if the points of tangency of such lines on the laser rod are beyond the horizons of the first and second rod cusps, respectively, associated with the given lamp, and (d) otherwise include the first and second rod cusps, respectively, associated with the given lamp;

iii. the first and second rod starting points associated with a given lamp (a) are the first and second rod cusps, respectively, associated with the given lamp if the tangent lines associated with the given lamp include those rod cusps and (b) are otherwise the points of tangency with the laser rod of the first and second tangent lines, respectively, associated with the given lamp; and iv. the lamp cusp associated with a given lamp is a point that is colinear with the given-lamp and laser-rod axes, is disposed on the side of the given lamp opposite the laser rod, and is spaced from the lamp surface by a lamp stand-off distance whose value is such that the effective lamp perimeter of the given lamp equals the part of the effective rod perimeter associated with the given lamp, where the effective lamp perimeter for a given lamp is the sum of the part of the lamp perimeter outside the lamp-cusp horizon plus twice the distance from the lamp cusp to the lamp-cusp horizon and where the part of the effective rod perimeter associated with a given lamp is the shortest distance outside the lamp between the rod cusps associated with the given lamp.

2. A laser as defined in claim 1 wherein the rod starting points are rod cusps.

3. An optically pumped laser comprising:
A. a cylindrical flash lamp having a longitudinal central lamp axis and adapted for optically pumping a laser rod;
B. a plurality of cylindrical laser rods having longitudinal central rod axes parallel to the lamp axis, the rods being so located with respect to each other and to the lamp as to define in cross section a base line associated with each rod and extending between the lamp axis and the rod axis of the associated rod, the base lines being equal in length and equiangularly spaced; and
C. a reflector wall consisting essentially of first and second wall sections associated with each rod, the cross sections of the first and second wall sections associated with a given rod essentially following first and second curves extending from a rod cusp associated with the given rod to second and first lamp cusps, respectively, associated with the given rod, the first and second curves consisting of the loci of points to which the sums of the distances, exterior to the lamp and the given rod, from first and second lamp starting points, respectively, associated with the lamp and from first and second rod starting points, respectively, on the given rod equal a fixed quantity, where:

i. the lamp cusps are points spaced a predetermined lamp stand-off distance from the lamp surface, are equal in number to the number of rods, are equiangularly spaced around the lamp, and are equidistant from the adjacent base lines, the two lamp cusps associated with a given rod being a pair of lamp cusps adjacent to each other and disposed on opposite sides of the base line associated with the given rod;

ii. the first and second rod starting points on a given rod are the points of tangency therewith of first and second tangent lines, respectively, associated with the given rod, the first and second tangent lines associated with a given rod being the lines that (a) intersect the base line associated with the given rod, (b) are tangent to the given rod, (c) are tangent to the lamp if the points of tangency of such lines on the lamp are beyond the horizons of the first and second lamp cusps, respectively, associated with the given rod, and (d) otherwise include the first and second lamp cusps, respectively, associated with the given rod;

iii. the first and second lamp starting points associated with a given rod (a) are the first and second lamp cusps, respectively, associated with the given rod if the tangent lines associated with the given rod include those lamp cusps and (b) are otherwise the points of tangency with the lamp of the first and second tangent lines, respectively, associated with the given rod; and iv. the rod cusp associated with a given rod is a point that is colinear with the given-rod and lamp axes, is disposed on the side of the given rod opposite the lamp, and is spaced from the rod surface by a rod stand-off distance whose value is such that the effective rod perimeter of the given rod equals the part of the effective lamp perimeter associated with the given rod, where the effective rod perimeter for a given rod is the sum of the part of the rod perimeter outside the rod-cusp horizon plus twice the distance from the rod cusp to the rod-cusp horizon and where the part of the effective lamp perimeter associated with a given rod is the shortest distance outside the lamp between the lamp cusps associated with the given rod.

4. A laser as defined in claim 3 wherein the lamp starting points are lamp cusps.

* * * * *